United States Patent
Wille et al.

(10) Patent No.: US 9,981,250 B2
(45) Date of Patent: May 29, 2018

(54) METHOD FOR PREPARING CATALYST COMPOSITION FOR EXHAUST GAS AFTER-TREATMENT

(71) Applicant: Heraeus Deutschland GmbH & Co. KG, Hanau (DE)

(72) Inventors: Ansgar Wille, Hanau-Mittelbuchen (DE); Marcus Bonifer, Offenbach (DE); Martina Kemmer, Kahl am Main (DE)

(73) Assignee: Heraeus Deutschland GmbH & Co. KG, Hanau (DE)

( * ) Notice: Subject to any disclaimer, the term of this patent is extended or adjusted under 35 U.S.C. 154(b) by 0 days. days.

(21) Appl. No.: 15/286,772

(22) Filed: Oct. 6, 2016

(65) Prior Publication Data

US 2017/0021336 A1  Jan. 26, 2017

Related U.S. Application Data

(63) Continuation of application No. 14/614,613, filed on Feb. 5, 2015, now Pat. No. 9,511,360.

(30) Foreign Application Priority Data

Feb. 6, 2014  (EP) ..................... 14154138

(51) Int. Cl.
| | |
|---|---|
| *B01J 21/04* | (2006.01) |
| *B01J 21/06* | (2006.01) |
| *B01J 23/10* | (2006.01) |
| *B01J 23/42* | (2006.01) |
| *B01J 23/44* | (2006.01) |
| *B01J 23/46* | (2006.01) |

(Continued)

(52) U.S. Cl.
CPC ............ *B01J 23/63* (2013.01); *B01D 53/945* (2013.01); *B01J 23/10* (2013.01); *B01J 23/40* (2013.01);
(Continued)

(58) Field of Classification Search
CPC . B01J 21/04; B01J 21/066; B01J 23/10; B01J 23/42; B01J 23/44; B01J 23/464;
(Continued)

(56) References Cited

U.S. PATENT DOCUMENTS 3,993,572 A * 11/1976 Hindin ............... B01D 53/9413
423/213.5
5,254,519 A * 10/1993 Wan ..................... B01D 53/945
502/252

(Continued)

FOREIGN PATENT DOCUMENTS

DE  100 24 994 A1  1/2001
EP   0 556 554 A2   8/1993
(Continued)

OTHER PUBLICATIONS

EP Search Report dated Jul. 9, 2014 in EP Application No. 14154138.3.
(Continued)

*Primary Examiner* — Cam N. Nguyen
(74) *Attorney, Agent, or Firm* — Panitch Schwarze Belisario & Nadel LLP

(57) ABSTRACT

The present invention relates to a catalytically effective composition for a multilayer catalyst for exhaust gas after-treatment of combustion facilities and to a multilayer catalyst containing the catalytically effective composition. Moreover, the invention relates to an exhaust gas after-treatment system and to a vehicle which both contain the catalyst according to the invention.

6 Claims, 4 Drawing Sheets

(51) Int. Cl.
    *B01J 23/63*     (2006.01)
    *B01J 35/00*     (2006.01)
    *B01J 35/02*     (2006.01)
    *B01J 35/04*     (2006.01)
    *B01J 37/04*     (2006.01)
    *B01D 53/94*     (2006.01)
    *B01J 23/40*     (2006.01)
    *F01N 3/10*     (2006.01)

(52) U.S. Cl.
    CPC .............. *B01J 23/44* (2013.01); *B01J 23/464* (2013.01); *B01J 35/0006* (2013.01); *B01J 35/023* (2013.01); *B01J 35/04* (2013.01); *B01J 37/04* (2013.01); *F01N 3/101* (2013.01); *B01D 2255/1021* (2013.01); *B01D 2255/1023* (2013.01); *B01D 2255/1025* (2013.01); *B01D 2255/206* (2013.01); *B01D 2255/2068* (2013.01); *B01D 2255/2092* (2013.01); *B01D 2255/407* (2013.01); *B01D 2255/908* (2013.01); *B01D 2255/9022* (2013.01); *B01D 2255/9202* (2013.01); *Y02T 10/22* (2013.01); *Y10T 428/24322* (2015.01)

(58) Field of Classification Search
    CPC ...... B01J 23/63; B01J 35/0006; B01J 35/023; B01J 35/04; B01J 37/04
    See application file for complete search history.

(56) References Cited

U.S. PATENT DOCUMENTS

| | | | |
|---|---|---|---|
| 5,462,907 A * | 10/1995 | Farrauto | B01D 53/864 502/304 |
| 5,496,788 A | 3/1996 | Domesle et al. | |
| 6,620,762 B2 * | 9/2003 | Tan | B01D 53/945 502/302 |
| 6,808,687 B1 | 10/2004 | Uenishi et al. | |
| 7,612,011 B2 * | 11/2009 | Vanderspurt | B01J 23/002 502/302 |
| 8,012,439 B2 | 9/2011 | Arnold et al. | |
| 8,187,548 B2 * | 5/2012 | Yamada | B01D 53/944 422/177 |
| 8,211,393 B2 | 7/2012 | Arnold et al. | |
| 8,815,189 B2 | 8/2014 | Arnold et al. | |
| 9,242,242 B2 | 1/2016 | Hilgendorff | |
| 9,289,751 B2 * | 3/2016 | Schoneborn | B01J 21/04 |
| 2011/0158871 A1 | 6/2011 | Arnold et al. | |
| 2012/0055141 A1 * | 3/2012 | Hilgendorff | B01J 23/58 60/301 |
| 2013/0336864 A1 * | 12/2013 | Zheng | B01J 23/63 423/213.5 |
| 2014/0044626 A1 | 2/2014 | Greenwell | |
| 2014/0221200 A1 * | 8/2014 | Schoneborn | B01J 21/04 502/303 |
| 2014/0234189 A1 | 8/2014 | Clowes et al. | |
| 2014/0322112 A1 | 10/2014 | Blakeman et al. | |
| 2014/0322113 A1 | 10/2014 | Blakeman et al. | |
| 2015/0217284 A1 | 8/2015 | Wille et al. | |

FOREIGN PATENT DOCUMENTS

| | | |
|---|---|---|
| EP | 1 053 779 A1 | 11/2000 |
| WO | 98/09726 A1 | 3/1998 |

OTHER PUBLICATIONS

Office Action dated May 9, 2016 in U.S. Appl. No. 14/614,613, by Wille.

* cited by examiner

METHOD FOR PREPARING CATALYST COMPOSITION FOR EXHAUST GAS AFTER-TREATMENT

CROSS-REFERENCE TO RELATED APPLICATIONS

This application is a continuation of co-pending U.S. patent application Ser. No. 14/614,613 filed Feb. 5, 2015, the entire disclosure of which is incorporated herein by reference.

BACKGROUND OF THE INVENTION

The present invention relates to a catalytically effective composition for a multilayer catalyst for exhaust gas after-treatment of combustion facilities and to a multilayer catalyst comprising the catalytically effective composition. Moreover, the invention relates to an exhaust gas after-treatment system and to a vehicle which both comprise the catalyst according to the invention.

It has long been customary, especially with regard to motor vehicles, to subject the exhaust gas of a combustion motor to after-treatment using a catalyst. The task of the catalyst is to convert the pollutants generated during combustion, i.e., hydrocarbons ($C_mH_n$), carbon monoxide (CO), and nitrogen oxides ($NO_x$), into the non-toxic substances carbon dioxide ($CO_2$), water ($H_2O$), and nitrogen ($N_2$). The following oxidation and reduction reactions take place in this process:

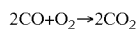
$2CO + O_2 \rightarrow 2CO_2$

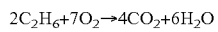
$2C_2H_6 + 7O_2 \rightarrow 4CO_2 + 6H_2O$

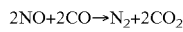
$2NO + 2CO \rightarrow N_2 + 2CO_2$

There are various types of catalysts. The best-known, aside from the three-way catalyst, are oxidation catalysts and $NO_x$ storage catalysts.

The three-way catalyst, also referred to as a controlled catalyst or "G-Kat," has become standard equipment in a motor vehicle fitted with a combustion engine. In this context, the term "controlled" refers to the motor management of the combustion. The three-way catalyst can only be used in vehicles equipped with a combustion engine and lambda control. In a three-way catalyst, the oxidation of CO and $H_mC_n$ and the reduction of $NO_x$ take place in parallel. This requires a constant air-fuel mixture at a stoichiometric ratio of lambda ($\lambda$) equal to 1.

In a combustion engine, the lambda probe ensures controlled combustion of the fuel. The lambda probe is used to determine the air-fuel ratio in the exhaust gas of the combustion engine. The measurement is based on the residual oxygen content present in the exhaust gas. The lambda probe is the main sensor in the control loop of the lambda control for catalytic after-treatment with a controlled catalyst and supplies the measured value to the motor control unit.

The lambda control establishes a desired lambda value in the exhaust gas of a combustion engine. In this context, lambda denotes the air-fuel ratio, which is the ratio of the mass of air available for combustion to the minimal stoichiometric mass of air required for complete combustion of the fuel. At the stoichiometric fuel ratio, exactly the amount of air required for complete combustion of the fuel is present. This is called $\lambda=1$. If more fuel is present, the mixture is called rich ($\lambda<1$), whereas an excess of air being present corresponds to a lean mixture ($\lambda>1$). If there is any deviation from the stoichiometric air-fuel ratio towards an excess of air, i.e., lean region, not all nitrogen oxides are decomposed, since the requisite reducing agents are being oxidized earlier. In the rich region, i.e., air deficit, not all hydrocarbons and not all of the carbon monoxide are decomposed.

The air-fuel equivalence ratio lambda, also called "air excess," air excess number," or "air ratio" for short, is a parameter of combustion technology. This parameter provides some feedback concerning the progress of the combustion, temperatures, generation of pollutants, and the efficiency. Proper fine-tuning of carburetor or fuel injection facility, and thus the adjustment of lambda, has a major impact on motor performance, fuel consumption, and the emission of pollutants.

Combustion engines are usually controlled to a narrow range of approx. $0.97<\lambda<1.03$. The range within these thresholds is called the lambda window. The best reduction of all three types of pollutants is attained within this window. At high motor performance, operating the engine with a rich mixture, and therefore colder exhaust gas, prevents the exhaust components, such as manifold, turbo-charger, and catalyst, from overheating.

To attain a value of $\lambda=1$ in operation, sufficient oxygen must be available in the catalyst in order to carry out the oxidation-reduction reactions indicated above. On the other hand, oxygen released during the reduction must be bound for the reduction of the nitrogen oxides to nitrogen to take place. Three-way catalysts usually contain an oxygen reservoir that is charged with oxygen at oxidizing conditions and can release oxygen again at reducing conditions.

In addition to the oxygen reservoir, a catalyst often also comprises at least one noble metal; usually this will be platinum, palladium, and/or rhodium. If aluminum oxide is also used in a catalyst, it is important to ensure that the rhodium does not become applied onto the aluminum oxide. At elevated temperatures, the rhodium adsorbs to the porous structure of the aluminum oxide and is therefore no longer available for the actual catalytic reaction. Accordingly, EP 1053779 A1 describes a catalyst in which the catalytically active layer comprises a cerium complex oxide and a zirconium complex oxide. While palladium is situated on the cerium complex oxide, platinum and rhodium are applied onto the zirconium complex oxide.

DE 10024 994 A1 describes a catalyst in which the noble metals are applied onto a substrate as separate layers. The catalyst comprises a first coating layer formed on a heat-resistant substrate and a second coating layer formed on the first coating layer. The first coating layer contains aluminum oxide bearing palladium; the second coating layer contains cerium zirconium complex oxides bearing both platinum and rhodium.

For improvement of the decomposition of exhaust gases in a catalyst, WO 98/09726 A1 describes a coating for a catalyst which comprises a first substrate for a first noble metal component and a second substrate for a second noble metal component, in which the average particle size of the second substrate is larger than the average particle size of the first substrate. This causes different noble metals to be separated from each other in operation of the catalyst. For this purpose, the respective noble metal components are affixed on their substrates and then ground to the desired size. The frits thus obtained are then applied onto a substrate to obtain a layer which comprises the smaller particles, in particular, in the lower region and the larger particles, in particular, in the upper region.

Different size distributions in a catalytically active layer are also known from EP 0556554 A2. Here, the coating dispersion that can be applied onto a catalyst comprises solids that have a multi-modal grain size distribution with different grain fractions.

Especially in motorcycles, the fluctuation of λ in operation of the motor can go beyond the common range for petrol engines of 0.97<λ<1.03. It is necessary in this case to have the catalyst still work properly and convert exhaust gases accordingly even if the deviation from λ=1 is larger, in particular in the range of 0.8<λ<1.2.

Accordingly, there is a need for catalytically effective compositions that can compensate even for high fluctuations of lambda in the range of 0.8<λ<1.2. Moreover, said compositions, used in a catalyst, are to produce high conversion rates in the treatment of exhaust gases. Specifically the emission of CO, HC, $NO_x$, and $CO_2$ should be reduced as compared to known catalysts both in rich and in lean operation of the motor.

BRIEF SUMMARY OF THE INVENTION

It is therefore the object of the present invention to provide a composition and a catalyst that facilitate reduced emissions of CO, HC, $NO_x$, and $CO_2$ in both rich and lean operation of a combustion motor.

A catalytically effective composition for exhaust gas after-treatment of combustion exhaust gases in a multilayer catalyst according to an embodiment of the invention comprises an oxygen storage material comprising one or more rare earth metals and one or more noble metals selected from platinum, rhodium, and palladium, and the composition has a particle size d90 in a range of 10 μm to 35 μm.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Surprisingly, it has been found that the underlying object of the present invention is met by a catalytically effective composition comprising an oxygen storage material comprising one or more metals selected from the group of the rare earth metals and one or more noble metals selected from platinum, rhodium, and palladium. The particle size d90 is preferably in the range of 10 μm to 35 μm, more preferably in the range of 15 μm to 30 μm, particularly preferably in the range of 19 μm to 24 μm.

d90 denotes a particle size in which 90% of the particles are smaller than the value d90. The particle size of the composition may also be defined by means of the particle sizes d50 and d10. Accordingly, 50% and 10%, respectively, of the particles are smaller than the value given.

Preferably, the composition has a particle size d50 in the range of 2.5 μm to 11.5 μm, more preferably of 4 μm to 10 μm, particularly preferably of 5.5 μm to 8.5 μm. Also preferably, it has a particle size d10 in the range of 1 μm to 4 μm, more preferably of 1 μm to 2 μm, particularly preferably of 1.0 μm to 1.8 μm.

In the present application, the terms, "particle size" and "particle size distribution" are used as synonyms and each refers to the particle size distribution determined with a CILAS 920 laser granulometer of Quantachrome (Odelzhausen, Germany) in accordance with ISO 13320. A low-energy laser diode with 3 mW power and a wavelength of 830 nm was used in the measurement.

The composition according to the invention is well-suited for use for exhaust gas after-treatment of combustion engines. Exhaust gases of combustion engines contain hydrocarbons and carbon monoxide, which are oxidized during the after-treatment. Nitrogen oxides from the exhaust gas are being reduced. To allow the oxygen to be removed from the nitrogen oxides and, concurrently, hydrocarbons and carbon monoxide to be oxidized, the composition comprises an oxygen storage material that comprises one or more metals selected from the group of the rare earth metals. Moreover, the composition comprises at least one noble metal selected from platinum, rhodium, and/or palladium.

Surprisingly, it has been found that the exhaust gases from combustion engines are decomposed particularly well in the composition according to the invention having a particle size d90 in the range of 10 μm to 35 μm, preferably in the range of 15 μm to 30 μm, particularly preferably in the range of 19 μm to 24 μm. In particular for lean conditions, the emission of hydrocarbons, carbon monoxide, and nitrogen oxides may be decreased markedly as compared to compositions having particle sizes of less than 10 μm. Specifically the emission of carbon monoxide decreases markedly if the motor is operated at rich conditions. Concurrently, the emission of carbon dioxide may be kept low as well.

Figure 3:
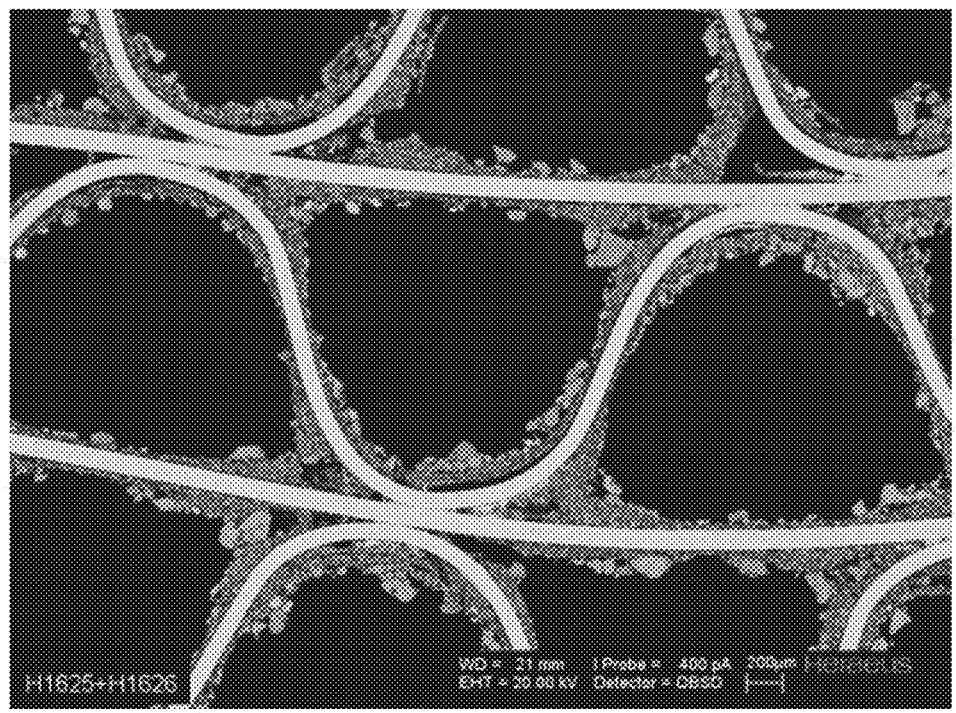
FIGS. 3 and 4 show scanning electron micrographs (SEMs), in which the particle size d90 of the second layer is higher than 35 μm.
Figure 4:
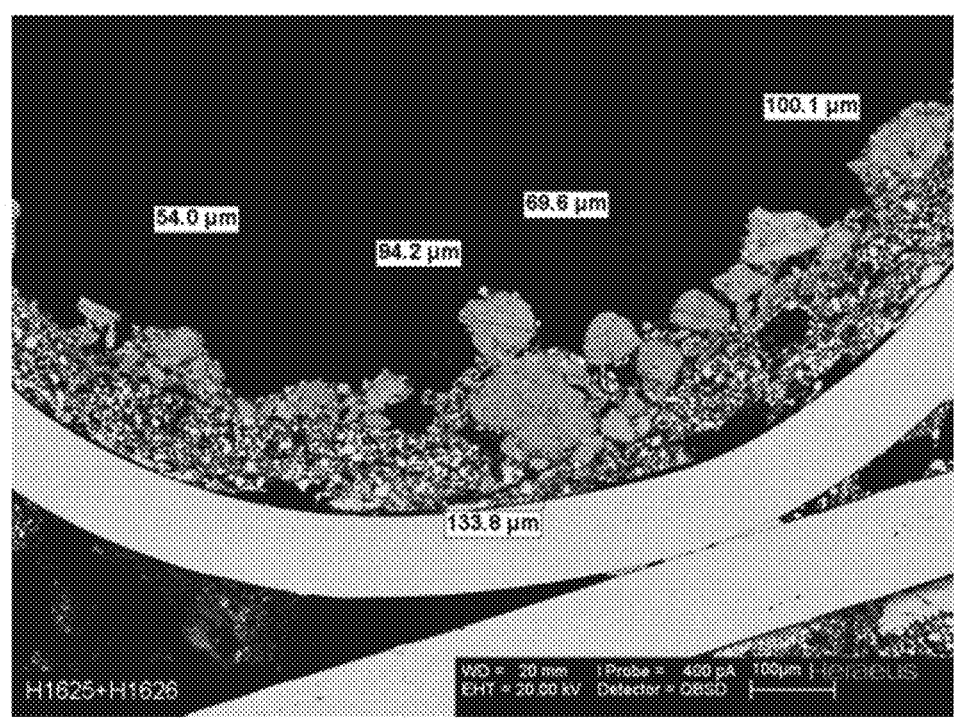

If the particle size d90 is above 35 μm, the use in a catalyst is no longer beneficial. If a catalyst substrate is coated with a composition of this large particle size, the particles are no longer present in mutually interlinked form. Rather, agglomerates are formed. FIG. 3 shows a scanning electron micrograph (SEM), in which the particle size d90 of the second layer is higher than 35 μm. The particle size of the individual particles in the second layer can be seen in FIG. 4. FIG. 4 shows details from FIG. 3.

According to the invention, the components of the compound are mixed with each other and may then be used, for example, in a catalyst. Grinding of the mixture, as described in the prior art, is not required according to the invention. Surprisingly, it has been found that the exhaust gas treatment was improved by the composition according to the invention made up of non-ground components as compared to known ground components.

The use of platinum and/or rhodium in the composition enables rapid incorporation and retrieval of oxygen into and from the oxygen storage material. When the exhaust gas to be treated contacts the composition according to the invention, nitrogen oxides may be reduced rapidly by removing the oxygen from the reaction equilibrium and storing it in the oxygen reservoir.

The use of palladium results in slower incorporation and retrieval of oxygen into and from the oxygen storage material. However, the palladium increases the oxygen storage capacity of the oxygen reservoir.

Preferably, the oxygen storage material is a cerium-zirconium oxide which may be either a mixed oxide of cerium and zirconium or a mixture of the two oxides, cerium oxide $CeO_2$ and zirconium oxide $ZrO_2$.

The catalytically effective composition may further comprise gamma-aluminum oxide ($\gamma$-$Al_2O_3$), in particular lanthanum oxide $La_2O_3$-doped gamma-aluminum oxide. During the use of the composition according to the invention in a catalyst, the $\gamma$-$Al_2O_3$ has an influence on the adhesion of the composition on the surface on the inside of the substrate.

The $\gamma$-$Al_2O_3$ preferably has a particle size d90 in the range of 10 μm to 35 μm, more preferably in the range of 15 μm to 30 μm, particularly preferably in the range of 19 μm to 24 μm. This substance may also be added to the composition according to the invention without grinding so that as before, no grinding step is required. It has surprisingly been found that the exhaust gas treatment was improved by the composition made up of non-ground components as compared to a composition made up of ground components.

The $\gamma$-$Al_2O_3$ preferably has a large BET surface area. The BET surface area of $\gamma$-$Al_2O_3$ is usually approx. 200 $m^2/g$. At high temperatures, as arise, for example, during the sintering during the production or in operation of a catalyst, this value decreases to approx. 40 to 50 $m^2/g$. Doping with lanthanum oxide attains higher thermal stability of $\gamma$-$Al_2O_3$. Even after thermal treatment, the BET surface area of $\gamma$-$Al_2O_3$ doped according to the invention is still in a range of more than 70 $m^2/g$, particularly preferably 90 $m^2/g$.

The BET surface area is also referred to as specific surface area and may be determined according to the BET method that is known according to the prior art. In the measurement, a gas, often nitrogen, is guided across the material to be tested. The BET equation is used to calculate from an adsorbed amount of gas the amount of adsorbate that forms a layer, the so-called monolayer, on the surface of the tested object. The BET surface area is equivalent to the number of mol Vm in the monolayer multiplied by Avogadro's number $N_A$ and the space needs of a gas molecule (nitrogen: $a_m=0.162\ nm^2$).

The catalytically effective composition according to the invention preferably comprises the oxygen storage material, at least one noble metal, and aluminum oxide. Providing this composition comprises the following steps:
 i. placing the oxygen storage material in water;
 ii. adding noble metal or noble metals in the form of one of the salts thereof in solution; and
 iii. placing aluminum oxide into the slurry obtained in step (ii).

In this context, the pH is preferably maintained in a range of 4 to 5 during the addition of the solution in step (ii). This is done using alkaline solvents that are known according to the prior art. Preferably, the pH value is adjusted using ammonia ($NH_3$). This enables effective application of the noble metal/noble metals onto the oxygen storage material. Surprisingly, it has been found that the light-off temperature of the multilayer catalyst according to the invention is better with regard to all emission levels (carbon monoxide CO, hydrocarbons HC, and nitrogen oxides $NO_x$) if ammonia is used to adjust the pH value rather than other bases, as shown in Table 1 below.

TABLE 1

Light-Off Temperatures of Catalysts

| Base | Light-off temperature [° C.] | | |
|---|---|---|---|
| | CO | HC | $NO_x$ |
| $NH_3$ | 175 | 179 | 180 |
| Ethanolamine | 205 | 208 | 209 |
| Tetraethylammoniumhydroxide (TEAOH) | 194 | 197 | 195 |
| Ethanolamine + citric acid | 184 | 186 | 185 |

In another embodiment, the present invention relates to the use of the composition in a multilayer catalyst for exhaust gas after-treatment of combustion engines and to the multilayer catalyst. A corresponding multilayer catalyst for exhaust gas after-treatment of combustion exhaust gases comprises a substrate structure comprising channels for passage of gases, wherein at least some of the channels comprise an exhaust gas inlet situated upstream with respect to the flow direction of the exhaust gases and a gas outlet situated downstream. At least some of the channels comprise a first layer (1) that is applied at least to the internal surface and a second layer (2) that at least partially covers the first layer (1), wherein the first layer (1) and the second layer (2) comprise a catalytically effective composition according to the invention.

Hereinafter, any reference in the description to first layer (1) shall be understood to mean the first catalytically effective layer (1). The same applies to the second layer (2) which shall be understood to mean the second catalytically effective layer (2). "Composition of the first layer (1)" shall be understood to mean the catalytically effective composition according to the invention which is applied onto the substrate structure as the first layer (1). "Composition of the second layer (2)" shall be understood to mean the catalytically effective composition according to the invention which is applied onto the substrate structure as the second layer (2).

The total thickness of first layer (1) and second layer (2) is preferably 100 μm or less, particularly preferably 50 μm or less. At these layer thicknesses, the exhaust gas can flow through the catalyst unimpeded. In this context, the exhaust gas still contacts the catalytically effective compositions of the individual layers to a sufficient degree. In the scope of the present invention, the total thickness of the layers shall be understood to be the average thickness on the wall of the substrate structure. Only planar surfaces of a wall are taken into account in the determination of the thickness of the layers in this context. Regions at which two or more walls hit or touch against each other, which are associated with the formation of hollow spaces of a triangle-like shape, are not taken into account in the determination of the total thickness of the layers.

Figure 1:
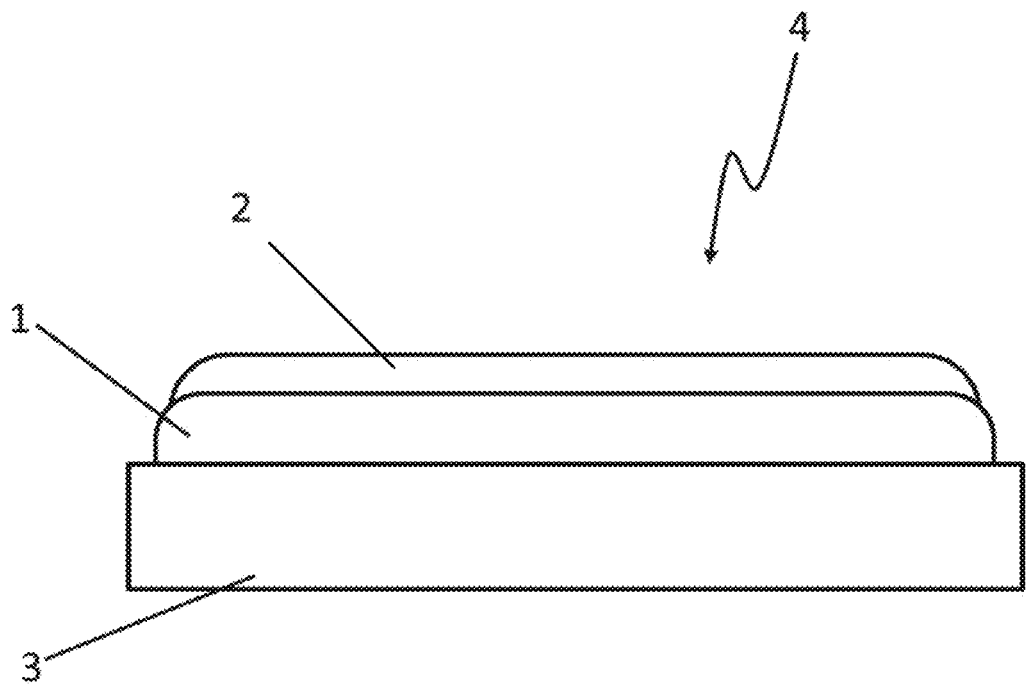
FIG. 1 schematically shows the design of a multilayer catalyst according to an embodiment of the invention having a substrate structure, a first layer (1), and a second layer (2)

Preferably, the first layer (1) and the second layer (2) comprise different catalytically effective compositions according to the invention. In the multilayer catalyst, the second layer (2) at least partially covers the first layer (1). In this context, the second layer (2) may preferably cover at least 50%, more preferably at least 60%, even more preferably at least 75%, in particular at least 85%, specifically at least 90% or at least 95% of the surface of the first layer (1). FIG. 1 schematically shows an embodiment in which the second layer (2) fully covers the first layer (2). When the exhaust gas to be treated flows over the two layers, it contacts the second layer (2) first at least in the overlapping regions.

A preferred embodiment of the present invention comprises a multilayer catalyst for exhaust gas after-treatment of combustion exhaust gases which comprises a substrate structure comprising channels for passage of gases, wherein at least some of the channels comprise an exhaust gas inlet situated upstream with respect to the flow direction of the exhaust gases and a gas outlet situated downstream. At least some of the channels comprise a first catalytically effective layer (1) that is applied at least to the internal surface and comprises a first a catalytically effective composition, and a second catalytically effective layer (2) that at least partially covers the first layer (1) and comprises a second catalytically effective composition. The first catalytically effective composition is different from the second catalytically effective composition.

However, both compositions possess a particle size d90 in the range of 10 μm to 35 μm, preferably in the range of 15 μm to 30 μm, particularly preferably in the range of 19 μm to 24 μm, preferably a particle size d50 in the range of 2.5 μm to 11.5 μm, preferably in the range of 4 μm to 10 μm, particularly preferably in the range of 5.5 μm to 8.5 μm, and, further, particularly preferably a particle size d10 in the range of 1 μm to 4 μm, preferably in the range of 1 μm to 2 μm, particularly preferably in the range of 1 μm to 1.8 μm.

It is particularly preferable for the first layer (1) and the second layer (2) to consist of the corresponding compositions.

In order to improve the exhaust gas treatment, the composition of the second layer (2) preferably comprises platinum and/or rhodium. The composition of the first layer (1) may comprise palladium. It has been found that the effect of the noble metals in the conversion of the exhaust gases is particularly high if these are present in separate layers. Specifically palladium should be present separate from platinum and rhodium. The catalyst heats up in operation and as a result, aggregates of the noble metals may be formed. Specifically palladium tends to form aggregates. If palladium is present in a layer together with platinum and/or rhodium, mixed aggregates are formed, which have a clearly lower catalytic activity as compared to the pure noble metals.

According to a preferred embodiment of the invention, due to the presence of palladium in the catalytically effective composition, the first layer (1) has a higher oxygen storage capacity than the second layer (2), which comprises a composition containing platinum and/or rhodium. Based on an oxygen storage capacity of the first layer (1) being 100%, the oxygen storage capacity of the second layer is preferably 50% to 80%, particularly preferably 70%. Accordingly, the oxygen storage capacity of the first layer (1) is 1.25-fold to 2-fold, in particular 1.4-fold, higher than the oxygen storage capacity of the second layer (2).

Accordingly, in a possible embodiment, the first layer (1) in a multilayer catalyst according to the invention comprises an oxygen storage material with an oxygen storage capacity of 800 μmol CO/g, whereas the oxygen storage material of the second layer (2) comprises an oxygen storage capacity of 511 μmol CO/g. The oxygen storage capacity is the stored amount of CO in μmol (micro-mol) relative to the mass of coating in the corresponding layer in units of gram. In this embodiment, the first layer (1) comprises an oxygen storage material that comprises 75 wt. % $CeO_2$ and 25 wt. % $ZrO_2$. The oxygen storage material of the second layer (2) in this embodiment comprises an oxygen storage material made of 58 wt. % $CeO_2$ and 42 wt. % $ZrO_2$. Surprisingly, it has been found that a larger oxygen storage capacity in a multilayer catalyst allows larger lambda fluctuations to be compensated.

The catalytically effective composition of the first layer (1) preferably comprises a palladium fraction of 0.05 wt. % to 10.00 wt. %, particularly preferably 0.10 wt. % to 10.00 wt. %, even more particularly preferably 0.50 wt. % to 5.00 wt. %, relative to the total composition of the first layer (1) being 100 wt. %.

The catalytically effective composition of the second layer (2) preferably comprises a platinum and/or rhodium fraction of 0.05 wt. % to 2.00 wt. %, particularly preferably 0.1 wt. % to 1.0 wt. %, even more particularly preferably 0.2 wt. %, relative to the total composition of the second layer (2) being 100 wt. %. The fraction of platinum and/or rhodium relates to the entire substance content of the second layer (2).

According to the invention, the second layer (2) may comprise just platinum, just rhodium or both platinum and rhodium. If both platinum and rhodium are present, the ratio of platinum to rhodium is preferably in the range of 1:5 to 5:1, particularly preferably 2:3.

The catalytically effective composition of the second layer (2) comprises an oxygen storage material that comprises one or more rare earth metals. Preferably, the rare earth metals are present as oxides, and the composition of the second layer (2) comprises, in particular, a fraction in the range of 70 wt. % to 90 wt. %, preferably 90 wt. %, relative to the total composition of the second layer (2) being 100 wt. %. The fraction of rare earth metals in the form of an oxide relates to the entire substance content of the second layer (2).

The oxygen storage material of the composition of the second layer (2) preferably comprises a cerium-zirconium oxide ($Ce_xZr_yO_z$). More preferably, the material comprises a cerium-rich cerium-zirconium oxide, in which the fraction of cerium oxide $CeO_2$, relative to the total oxide, is at least 50 wt. % and the fraction of zirconium oxide $ZrO_2$ is lower than the fraction of cerium oxide $CeO_2$. The oxygen storage material may comprise a $CeO_2$ fraction in the range of 50 wt. % to 80 wt. % and a $ZrO_2$ fraction in the range of 10 wt. % to 40 wt. %, in particular 60 wt. % $CeO_2$ and 30 wt. % $ZrO_2$, each relative to the total composition of the second layer (2) being 100 wt. %, i.e., the entire substance content of the second layer (2).

The thermal stability of the oxygen storage material is relevant for the conversion rate attained by the multilayer catalyst. The oxygen storage material is a porous material. Pure cerium oxide also has a porous structure. The noble metal is applied onto the oxygen storage material. In operation, the exhaust gas flows onto the oxygen storage material of the catalytically effective layers. Since the surface is porous, the flows become turbulent, which leads to improved contact between the catalytically effective layers and the exhaust gases to be treated.

If the pore size of the oxygen storage material is too small, the exhaust gas flows along the surfaces of the oxygen storage material. However, the catalytically effective noble metal is situated not only on the surface, but also on the inside of the oxygen storage material in the pores thereof. If the pore size is too small, the noble metal situated on the inside is not available during operation for treatment of the exhaust gas. Mainly, the pore volume and the pore radius, as well as the size of the orifice of the pores, are crucial in this context. These must be maintained, at least in part, during both production and in operation, and have at least a minimal size.

In the preferred cerium-zirconium oxide according to the invention, the structure of pure cerium oxide is interrupted by the zirconium oxide. This leads to a change of the pore volume and pore radius of the oxygen storage material. In particular, the thermal stability of the structure is increased. The pores remain stable even during operation at temperatures above 500° C. Therefore, in operation, the entire amount of noble metal present is available for reaction with the exhaust gas. It has been found that a fraction of at least 10 wt. % zirconium oxide in the oxygen storage material provides for sufficient thermal stability. However, a fraction of zirconium oxide exceeding 45 wt. % leads to a decrease of the oxygen storage capacity of the oxygen storage material.

During the production and/or in operation of a multilayer catalyst, a catalyst is exposed to high temperature stress. In order to determine the stability of the pore structure of the oxygen storage materials, these are subjected to a temperature of 1000° C. for a period of approx. 3 to 8 hours. The BET surface area is determined following this temperature treatment. Oxygen storage materials consisting of cerium oxide and zirconium oxide comprise a BET surface area of 20 m$^2$/g or less after a temperature treatment at 1000° C.

However, it has been found that the BET surface area of the oxygen storage materials may be set. In order to obtain a larger BET surface area of 30 m$^2$/g or more after a temperature treatment at 1000° C., the oxygen storage material of the catalytically effective composition of the second layer (2) preferably further comprises one or more metals selected from the group consisting of neodymium, praseodymium, lanthanum, and hafnium. Preferably, the metals are present in the form of the oxides thereof. In this context, the fraction of the respective metal oxides may be 2 wt. % to 10 wt. %, preferably 3 wt. % to 7 wt. %, relative to 100 wt. % of the oxygen storage material.

Doping the oxygen storage material at such levels leads to the oxygen storage material showing improved thermal stability. If the fraction is lower, no effect is detectable. Conversely, higher fractions of more than 10 wt. % do not increase the stability any further. Moreover, the addition of praseodymium, lanthanum, neodymium, and/or hafnium accelerates the incorporation and retrieval of oxygen into and from the oxygen storage material.

Table 2 below shows the corresponding BET surface area of different oxygen storage materials after temperature treatment at 1000° C. The oxygen storage materials No. 1 and No. 5 consist of CeO$_2$ and ZrO$_2$. These comprise a BET surface area of less than 20 m$^2$/g. Doping with oxides of praseodymium, lanthanum, neodymium and/or hafnium increases the BET surface area after temperature treatment. Accordingly, the thermal stability of the oxygen storage materials is increased by the doping.

TABLE 2

BET Surface Area of Oxygen Storage Materials

| Oxygen storage material | CeO$_2$ [wt. %] | ZrO$_2$ [wt. %] | Nd$_2$O$_3$ [wt. %] | La$_2$O$_3$ [wt. %] | Y$_2$O$_3$ [wt. %] | Pr$_6$O$_{11}$ [wt. %] | BET [m$^2$/g] |
|---|---|---|---|---|---|---|---|
| No. 1 | 70 | 30 | | | | | 17 |
| No. 2 | 56 | 39 | 5 | | | | 28 |
| No. 3 | 65 | 27 | | 8 | | | 30 |
| No. 4 | 60 | 25 | 5 | 2 | 8 | | 33 |
| No. 5 | 58 | 42 | | | | | 16 |
| No. 6 | 60 | 30 | | 3 | | 7 | 49 |
| No. 7 | 68 | 24 | 5 | | | 3 | 17 |

Doping of the oxygen storage material of the second layer (2) according to the invention with oxides of praseodymium, lanthanum, neodymium, and/or hafnium leads to a decrease of the oxygen storage capacity. For example, a catalytically effective layer according to the invention comprising an oxygen storage material that consists of 75 wt. % CeO$_2$ and 25 wt. % ZrO$_2$ and palladium has an oxygen storage capacity of approx. 800 µmol CO/g. In contrast, an oxygen storage material that consists of just cerium oxide has an oxygen storage capacity of approx. 730 µmol CO/g.

Replacing the oxygen storage material with a doped cerium-zirconium oxide causes the oxygen storage capacity to decrease. For example, doping the oxygen storage material with 4 wt. % lanthanum oxide leads to an oxygen storage capacity of 710 µmol CO/g, whereas doping with 12 wt. % lanthanum oxide leads to a capacity of approx. 600 µmol CO/g.

Accordingly, the properties of the catalytically active layer may be set by the amount of neodymium, praseodymium, lanthanum, and hafnium added to the oxygen storage material of the second layer (2). These materials may be used to influence, and set according to need, the thermal stability, oxygen storage capacity, and the rate of oxygen incorporation and retrieval.

The oxygen storage capacity of a material may be determined, for example, by CO chemisorption. For this purpose, the sample to be analyzed is first fully oxidized with oxygen at a certain temperature (350° C.). Then the sample is exposed to "pulses" (doses of CO) until no oxygen for oxidation of CO remains in the sample. The gas flowing through the sample to be analyzed is then detected. Analysis of the area under the peaks in the detection process allows the amount of converted CO to be determined, which is a measure of the oxygen storage capacity. The oxygen storage capacity is therefore reported in units of µmol CO per gram of catalytically effective composition.

The catalytically effective composition of the first layer (1) preferably comprises palladium. It further comprises an oxygen storage material that comprises one or more rare earth metals. Preferably, the oxygen storage material is a cerium-zirconium oxide (Ce$_x$Zr$_y$O$_z$) which preferably comprises 50 wt. % to 80 wt. % CeO$_2$ and 10 wt. % to 40 wt. % ZrO$_2$, particularly preferably 60 wt. % CeO$_2$ and 30 wt. % ZrO$_2$, relative to the total composition of the first layer (1) being 100 wt. %.

As before, the addition of ZrO$_2$ to CeO$_2$ leads to improved thermal stability and thus to the multilayer catalyst having higher activity and a longer service life, as illustrated with regard to the oxygen storage material of the second layer (2).

Preferably, the catalytically effective composition of the first layer (1) comprises a fraction of the oxygen storage material of 40 wt. to 90 wt. %, particularly preferably a fraction of 70 wt. %, relative to the total composition of the first layer (1) being 100 wt. %. The palladium fraction in this layer is preferably in the range of 0.5 wt. % to 5 wt. %.

The first layer (1) and/or the second layer (2) are preferably loaded with the corresponding catalytically effective composition in the range of 40 g/L to 150 g/L, particularly preferably 75 g/L. The loading indicates the amount of composition applied relative to the void volume of the catalyst.

Preferably, the composition of the first layer (1) comprises an oxygen storage material and the composition of the second layer (2) comprises an oxygen storage material, in which the oxygen storage material of the composition of the first layer (1) differs from the oxygen storage material of the composition of the second layer (2). In this context, both the composition of the first layer (1) and/or the composition of the second layer (2) may further comprise gamma-aluminum oxide, which is preferably doped with lanthanum oxide.

If the composition of the first layer (1) comprises gamma-aluminum oxide ($\gamma$-$Al_2O_3$), the fraction of $\gamma$-$Al_2O_3$ is preferably 10 wt. % to 60 wt. %, particularly preferably 30 wt. %, relative to the total composition of the first layer (1) being 100 wt. %. If the composition of the second layer (2) comprises gamma-aluminum oxide ($\gamma$-$Al_2O_3$), the fraction of $\gamma$-$Al_2O_3$ is preferably 10 wt. % to 30 wt. %, particularly preferably 10 wt. %, relative to the total composition of the second layer (2) being 100 wt. %.

The fraction of $\gamma$-$Al_2O_3$ in the catalytically effective layer has an influence on the adhesion of the composition on the surface on the inside of the substrate. The first layer (1) is fully applied onto the substrate material of the multilayer catalyst according to the invention, whereas the second layer (2) is partially applied onto the first layer (1) and partially onto the substrate material. Therefore, the composition of the first layer (1) preferably comprises a higher fraction of $\gamma$-$Al_2O_3$ than the composition of the second layer (2). If the fraction of $\gamma$-$Al_2O_3$ in the composition of the second layer (2) exceeds 30 wt. %, the $NO_x$ conversion of the layer deteriorates. Accordingly, the $NO_x$ conversion of the multilayer catalyst according to the invention improves with increasing fraction of oxygen storage material in the second layer. By reducing the amount of oxygen storage material used in a catalyst according to the invention by half and replacing it with $\gamma$-$Al_2O_3$, the emission increases by approx. 25 to 30%. If oxygen storage materials according to the invention having $\gamma$-$Al_2O_3$ fractions of 30 wt. % or less are used, the emission of nitrogen oxides ($NO_x$) is approx. 0.0099 g/km (grams of $NO_x$ per kilometer travelled). By reducing the amount of oxygen storage material by half, this value increases to 0.125 g/km.

Preferably, the $\gamma$-$Al_2O_3$ is lanthanum oxide $La_2O_3$-doped aluminum oxide. The $La_2O_3$ content, relative to the amount of $Al_2O_3$, is preferably in the range of 2 wt. % to 4 wt. %, particularly preferably 3 wt. %.

The $\gamma$-$Al_2O_3$ preferably has a large BET surface. The BET surface area of $\gamma$-$Al_2O_3$ usually is approx. 200 $m^2$/g. At high temperatures, as arise, for example, during the sintering during the production or in operation of a catalyst, this value decreases to approx. 40 to 50 $m^2$/g. Doping with lanthanum oxide attains higher thermal stability of $\gamma$-$Al_2O_3$. Even after thermal treatment, the BET surface area of $\gamma$-$Al_2O_3$ doped according to the invention is still in a range of more than 70 $m^2$/g, particularly preferably 90 $m^2$/g.

Therefore, a multilayer catalyst according to the invention preferably comprises at least a first catalytically effective composition in a first layer (1), which comprises an oxygen storage material, $La_2O_3$-doped $\gamma$-$Al_2O_3$, and palladium, and a second catalytically effective composition in a second layer (2), which comprises an oxygen storage material, $La_2O_3$-doped $\gamma$-$Al_2O_3$, and platinum and/or rhodium.

It is known from the prior art that rhodium situated on $\gamma$-$Al_2O_3$ is not available for the actual catalytic reaction or only to a limited degree. For this reason, platinum and/or rhodium in the composition of the second layer (2) are preferably present at least almost exclusively on the oxygen storage material. In the scope of the present invention, "almost exclusively" shall be understood to mean that at least 90%, preferably at least 95%, in particular at least 98%, specifically 99%, of the noble metal or noble metals is applied onto the oxygen storage material.

Surprisingly, it has been found that a balance between low light-off temperature and, concurrently, a large lambda window, may be attained if the palladium in the composition of the first layer (1) is not present almost exclusively on the oxygen storage material. In a preferred embodiment, a fraction of 30 wt. % to 40 wt. %, in particular 30 wt. %, of the palladium is situated on the $\gamma$-$Al_2O_3$, whereas 60 wt. % to 70 wt. %, in particular 70 wt. %, of the palladium is situated on the oxygen storage material. The palladium in the composition of the first layer (1) being applied almost exclusively onto the oxygen storage material has a detrimental effect on the light-off behavior of the multilayer catalyst according to the invention.

Preferably, the first layer (1) is essentially free of platinum and/or rhodium. Preferably, the second layer (2) is essentially free of palladium. In the scope of the present invention, "essentially free" shall be understood to mean that the weight ratio of palladium in the second layer (2) to palladium in the first layer (1) is preferably less than 1:10, more preferably less than 1:50, in particular less than 1:100 or less than 1:500, specifically 0, and that the weight ratio of platinum and/or rhodium in the first layer (1) to platinum and/or rhodium in the second layer (2) is preferably less than 1:10, more preferably less than 1:50, in particular less than 1:100 or less than 1:500, specifically 0.

Table 3 below shows the concentrations of exhaust gases (carbon monoxide CO, hydrocarbon HC, nitrogen oxides $NO_x$, and carbon dioxide $CO_2$) after passage of the exhaust gases over a multilayer catalyst according to the invention.

TABLE 3

Exhaust Gas Concentrations

| Example No. | Motor conditions | Concentration [g/km] | | | | Catalyst | |
|---|---|---|---|---|---|---|---|
| | | CO | HC | NOX | CO2 | $1^{st}$ layer | $2^{nd}$ layer |
| 1 | lean | 0.479 | 0.054 | 0.086 | 55.206 | X11007 | X11009 |
| 2 | rich | 0.761 | 0.081 | 0.059 | 69.422 | X11007 | X11009 |

The multilayer catalyst comprises the composition denoted X11007 as first layer (1). The composition comprises an oxygen storage material fraction of 8.42% (60% $CeO_2$, 30% $ZrO_2$, 3% $La_2O_3$, and 7% $Pr_6O_{11}$). The rhodium fraction is 0.05%, the palladium fraction is 1.68%. The fraction of $La_2O_3$-doped $\gamma$-$Al_2O_3$ (97.1% $Al_2O_3$, 2.9% $La_2O_3$) was 81.38%. Moreover, the composition contains 8.48% $Al_2O_3$.

The multilayer catalyst comprises the composition denoted X11009 as second layer (2). The composition comprises an oxygen storage material fraction of 88.10% (60% $CeO_2$, 30% $ZrO_2$, 3% $La_2O_3$, and 7% $Pr_6O_{11}$). The fractions of rhodium and platinum are each 0.09%. The fraction of $La_2O_3$-doped $\gamma$-$Al_2O_3$ (97.1% $Al_2O_3$, 2.9% $La_2O_3$) is 3.2%. Moreover, the composition contains 8.51% $Al_2O_3$.

Table 4 shows exhaust gas levels obtained with an uncoated catalyst (comparative example 3) or a catalyst coated with compositions that have been ground and do not have particle sizes according to the invention (comparative examples 4 and 5).

TABLE 4

Exhaust Gas Levels of Coated and Uncoated Catalysts

| Comparative Example No | Motor condition | Concentration [g/km] | | | | Catalyst | |
|---|---|---|---|---|---|---|---|
| | | CO | HC | NOX | CO2 | 1$^{st}$ layer | 2$^{nd}$ layer |
| 3 | lean | 0.734 | 0.074 | 0.092 | 70.298 | Raw emission without catalytic coating | |
| 4 | lean | 0.598 | 0.079 | 0.102 | 68.31 | X11006 | X11005 |
| 5 | rich | 1.182 | 0.062 | 0.038 | 70.465 | X11006 | X11005 |

Composition X11005 from the comparative examples has a fraction of 8% of oxygen storage material No. 6 from Table 2 and further comprises 82% lanthanum-doped aluminum oxide (consisting of 97 wt. % $Al_2O_3$ and 3 wt. % $La_2O_3$). Moreover, composition X11005 contains platinum and a rhodium fraction (0.09 wt. % each).

Composition X11006 has a fraction of 85% of oxygen storage material No. 6 from Table 2 and further comprises 6% lanthanum-doped aluminum oxide (consisting of 97 wt. % $Al_2O_3$ and 3 wt. % $La_2O_3$). The rhodium content is 0.05 wt. %; the palladium content is 1.61 wt. %.

The particle sizes of inventive compositions X11007 and X11009 and non-inventive compositions X11006 and X11005 are shown in Table 5.

TABLE 5

Particle Sizes of Catalysts

| | Composition | Layer | D90 | D50 | D10 |
|---|---|---|---|---|---|
| Inventive examples 1 and 2 (not ground) | X11007 | 1 | 22.92 | 6.67 | 1.61 |
| | X11009 | 2 | 23.68 | 6.23 | 1.08 |
| Comparative examples 4 and 5 (ground) | X11006 | 1 | 6.46 | 3.17 | 1.06 |
| | X11005 | 2 | 5.66 | 2.35 | 0.55 |

It has been shown that the emission of $CO_2$ was barely reduced using a catalyst comprising a ground composition, especially in rich operation. In contrast, a catalyst according to the invention showed clearly reduced exhaust gas levels, both in rich and lean operation of a combustion motor. The exhaust gas levels were determined in accordance with the Euro-3 standard (test cycle: cycle specified in ordinance ECE R40) in all examples.

The multilayer catalyst according to the invention comprises a substrate structure that contains channels for passage of gases. A catalytically effective composition is applied to the internal surface of at least some of the channels. The substrate structure may comprise a ceramic or a metallic material in this context. Preferably, it comprises a metallic material, in particular a metallic foil that comprises iron, chromium, and aluminum.

According to the invention, the metallic foil preferably comprises an aluminum fraction of 4 wt. % to 6 wt. % and a chromium fraction of 15 wt. % to 20 wt. %. If the aluminum fraction is more than 6 wt. %, the foil is not sufficiently flexible to be made into the desired shape of the substrate structure. If the aluminum fraction is less than 4 wt. %, the catalytically effective layer does not adhere to it. It has been found that homogeneous distribution of the aluminum in the foil is important. Due to the influence of heat and oxygen, aluminum oxide is formed and migrates to the surface of the metal foil. If the concentration of aluminum on the surface is very high, a rough surface structure is formed. This takes place with foils having an aluminum fraction of more than 6 wt. % and may be observed, for example, using a scanning electron microscope. The catalytically effective layer does not, or only poorly, adheres to the rough surfaces. This way, the catalyst is not ensured to be effective.

However, such rough surfaces may also form locally. If the aluminum is not distributed homogeneously in the metallic foil, sites at which the local aluminum concentration exceeds 6% may form rough surface regions to which the catalytically effective layer also cannot adhere.

The thickness of the metallic foil is preferably in the range of 30 μm to 200 μm, preferably 100 μm. If the foil is thinner than 30 μm, it fails to have sufficient thermal stability and mechanical stability. Conversely, if the foil is more than 200 μm in thickness, it is too rigid to be made into the desired shape. Moreover, the weight of the catalyst increases.

At least some of the channels of the substrate structure comprise the first catalytically effective layer (1), which is at least partially applied to the internal surface, and the second catalytically effective layer (2), which at least partially covers the first layer (1). In this context, the second layer (2) may cover at least 50%, preferably at least 60%, more preferably at least 75%, in particular at least 85%, specifically at least 90% or at least 95% of the surface of the first layer (1).

Preferably, the second layer (2) does not fully cover the surface of the first layer (1). Preferably, the second layer (2) covers a range of 60% to 95%, preferably of 70% to 90%, in particular 72% to 88%, of the surface of the first layer (1). It has been found that a ratio of the length of the first layer (1) along the flow direction to the length of the second layer (2) along the flow direction in a range of 1:2 to 2:1, preferably of 1:1.5 to 1.5:1, in particular of 1:1.2 to 1.2:1, is particularly preferred.

The conversion rate of the catalyst is lower if the second layer (2) covers the surface of the first layer (1) completely. Moreover, there is a negative effect when the first layer (1) is arranged downstream of the second layer (2) in flow direction, i.e., when there is no overlap of the two layers. In this type of zone coating, in which there is little or no overlap of the two layers, the CO emission is clearly higher than with layered coating, in which the first layer (1) and second layer (2) overlap according to the invention. Accordingly, the conversion of the exhaust gas flowing from the combustion engine gets poorer, as is evident from Table 6 below. The values in Table 6 are the emission levels, i.e., the amount of CO and $NO_x$ measured according to the official measuring cycle after passage through the catalyst. An overall deterioration of the emission results both upon zone coating and layered coating if the layers were aged, i.e., subjected to a temperature treatment. However, even after ageing, the emission limits of 2.0 g/km for CO and 0.150 g/km for $NO_x$ are still met.

TABLE 6

Conversion of Exhaust Gas

| Type of coating | CO [g/km] | $NO_x$ [g/km] |
|---|---|---|
| Zone coating | 0.507 | 0.094 |
| Layered coating | 0.368 | 0.107 |
| Zone coating, aged | 0.912 | 0.127 |
| Layered coating, aged | 0.625 | 0.127 |

Aside from the first layer (1) and the second layer (2), the multilayer catalyst according to the invention may comprise further catalytically active layers that contain compositions according to the invention. Preferably, the catalyst comprises two catalytically active compositions.

Figure 2:
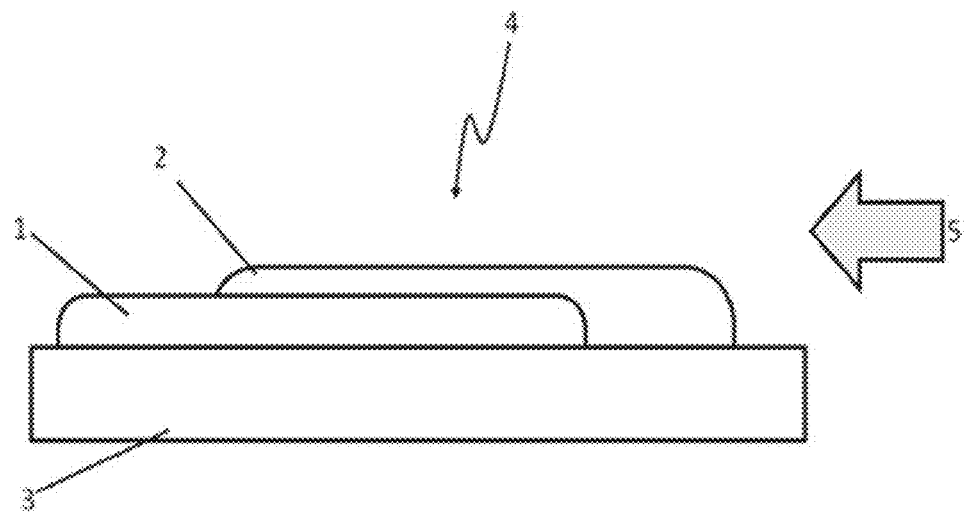
FIG. 2 shows a preferred embodiment, in which the arrow indicates the flow direction of the exhaust gas to be treated.

In a preferred embodiment, the first layer (1) and the second layer (2) are arranged appropriately such that the exhaust gas, in operation, contacts the second layer (2) first. This embodiment is shown in FIG. 2. When the exhaust gas flows from the combustion engine into the catalyst, it encounters the second layer (2) first in this embodiment. Nitrogen oxides may be reduced on this layer by removing oxygen from the reaction equilibrium. This reaction must proceed rapidly enough in order to attain a high conversion rate, which is made feasible by having platinum and/or rhodium present in the second layer (2). Subsequently, the exhaust gas flows to the first layer (1), which comprises palladium. Palladium present in the first layer (1) provides for slower incorporation and retrieval of oxygen into and from the oxygen storage material as compared to the second layer (2). However, the palladium increases the oxygen storage capacity of the oxygen reservoir of the first layer (1). Oxygen stored in the oxygen reservoir of the second layer (2) may therefore be released to the oxygen reservoir of the first layer (1). This prevents saturation of the oxygen reservoir of the second layer (2), which would lead to deteriorated reduction of the nitrogen oxides.

Due to the use of platinum and/or rhodium in the second layer (2) and the use of palladium in the first layer (1), the second layer (2), at operational conditions, has a higher activity with regard to the reduction of nitrogen oxides than the first layer (1).

Preferably, the multilayer catalyst according to the invention is a three-way catalyst. This is particularly preferred for exhaust gas after-treatment of four-cylinder petrol motors, in particular for exhaust gas after-treatment of motorcycles with four-cylinder petrol motors with a cubic capacity of up to 2,000 $cm^3$. The operation of these is associated with a large fluctuation of lambda in a range of 0.7 to 1.3, in particular of 0.8 to 1.2. The multilayer catalyst according to the invention can convert the exhaust gases almost completely even with these lambda fluctuations.

A multilayer catalyst according to the invention may be used, for example, in small motors, motorcycles, automotive industry, utility vehicles, industrial and special applications, and marine applications.

According to the invention, a production method for the multilayer catalyst described above comprises the following steps:
  a) providing a substrate structure;
  b) providing a first catalytically effective composition;
  c) coating the substrate structure with the first catalytically active composition to produce a first layer (1);
  d) providing a second catalytically effective composition; and
  e) coating the substrate structure with the second catalytically active composition to produce a second layer (2);

The first and the second compositions are applied appropriately such that the first layer (1) is at least partially covered by the second layer (2). The term "coating" may be understood to encompass all types of coating known from the prior art, such as injecting, spraying or immersing.

Preferably, the first layer (1) and the second layer (2) are arranged appropriately such that the exhaust gas, in operation, contacts the second layer (2) first.

The substrate structure may be annealed together with the first composition after coating with the first catalytically effective composition and before coating with the second catalytically effective composition. This preferably takes place at a temperature from 500 to 900° C., more preferably from 650 to 850° C., most preferably at 750° C. Even after the coating with the second catalytically effective composition, the substrate structure is preferably annealed at a temperature of 700° C. or more. The composition thus applied may be dried before the corresponding annealing. The drying takes place at temperatures in the range of 90° C. to 150° C., preferably at 110° C. Usually, the drying takes place in air. That is, a chemically-inert atmosphere is not required, but such an atmosphere also does not interfere with the drying process.

In a further embodiment, the underlying object of the present invention is met by an exhaust gas after-treatment system that comprises one or more motors, in particular petrol motors, and one or more multilayer catalysts according to the invention. Preferably, a 4-cylinder petrol motor is connected via an exhaust gas feed to the multilayer catalyst in the exhaust gas after-treatment system.

Preferably, the motor in the exhaust gas after-treatment system is a drive unit in a vehicle or a combined heat and power unit.

In a further embodiment, the underlying object of the present invention is met by a vehicle that comprises a multilayer catalyst according to the invention or an exhaust gas after-treatment system according to the invention. The vehicle preferably comprises a four-cylinder petrol engine and is selected from the group consisting of motorcycle, JetSki, trike, and quad bike. Preferably, the vehicle is a motorcycle.

According to the invention, the present application further comprises an exhaust gas after-treatment system and method. This method comprises the following elements:
  a) flowing an exhaust gas over a surface comprising a substrate structure, a first catalytically effective layer (1) that is at least partially applied onto the substrate (3), and a second catalytically effective layer (2) that at least partially covers the first layer (1), in which the first layer (1) and the second layer (2) comprise a catalytically effective composition; and
  b) contacting the exhaust gas flow with the second layer (2) and the first layer (1).

Preferably, the second layer (2), at operating conditions, has a higher activity with regard to the reduction of nitrogen oxides ($NO_x$ reduction) as compared to the first layer (1). The first layer (1) and the second layer (2) are preferably configured appropriately such that the flow of exhaust gas reaches and contacts the second layer (2) first.

Preferably, this relates to an exhaust gas after-treatment method for the combustion exhaust gases of a four-cylinder petrol motor. This method comprises the following steps:
  a) flowing a combustion exhaust gas of a four-cylinder petrol motor through the channels of a substrate structure, in which at least some of the channels comprise a first catalytically effective layer (1) that is at least partially applied onto the internal surface, and a second catalytically effective layer (2) that at least partially covers the first layer (1), in which the first layer (1) and the second layer (2) comprise a catalytically effective composition; and
  b) contacting the exhaust gas flow with the second layer (2) and the first layer (1).

Preferably, the second layer (2), at operating conditions, has a higher activity with regard to the reduction of nitrogen oxides (NO$_x$ reduction) as compared to the first layer (1). The first layer (1) and the second layer (2) are preferably configured appropriately such that the flow of exhaust gas reaches and contacts the second layer (2) first.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A method for preparing a catalytically effective composition for exhaust gas after-treatment of combustion exhaust gases in a multilayer catalyst, wherein the composition comprises an oxygen storage material comprising one or more rare earth metals, aluminum oxide, and at least one noble metal selected from the group consisting of platinum, rhodium, and palladium, wherein the composition has a particle size d90 in a range of 10 μm to 35 μm, the method comprising:
   (i) placing the oxygen storage material in water;
   (ii) adding a solution of a salt of the at least one noble metal to form a slurry; and
   (iii) adding aluminum oxide to the slurry.

2. The method according to claim 1, further comprising maintaining a pH in a range of 4 to 5 during the addition of step (ii).

3. The method according to claim 2, wherein the pH is adjusted using ammonia.

4. The method according to claim 1, wherein the composition has a particle size d10 in a range of 1 μm to 4 μm.

5. The method according to claim 1, wherein the composition has a particle size d50 in a range of 2.5 μm to 11.5 μm.

6. The method according to claim 1, wherein the oxygen storage material comprises a cerium-zirconium oxide.

* * * * *